(12) United States Patent
Linnell

(10) Patent No.: US 9,588,408 B1
(45) Date of Patent: Mar. 7, 2017

(54) METHODS AND SYSTEMS FOR PROJECTING A TARGET PORTION OF AN IMAGE AT A HIGHER RESOLUTION

(71) Applicant: Linnell Stowell, San Francisco, CA (US)

(72) Inventor: Jeffrey Linnell, San Francisco, CA (US)

(73) Assignee: Autofuss, San Francisco, CA (US)

( * ) Notice: Subject to any disclaimer, the term of this patent is extended or adjusted under 35 U.S.C. 154(b) by 157 days.

(21) Appl. No.: 14/336,896

(22) Filed: Jul. 21, 2014

Related U.S. Application Data

(60) Provisional application No. 61/993,820, filed on May 15, 2014.

(51) Int. Cl.
  *H04N 9/31* (2006.01)
  *G03B 21/14* (2006.01)

(52) U.S. Cl.
  CPC ........... *G03B 21/14* (2013.01); *H04N 9/3147* (2013.01); *H04N 9/3188* (2013.01); *H04N 9/3194* (2013.01)

(58) Field of Classification Search
  CPC ...... H04N 5/74; H04N 9/3147; H04N 9/3188; H04N 9/3194
  See application file for complete search history.

(56) References Cited

U.S. PATENT DOCUMENTS

| | | | |
|---|---|---|---|
| 7,097,311 B2 | 8/2006 | Jaynes | |
| 7,134,080 B2* | 11/2006 | Kjeldsen | H04N 5/74 348/E5.137 |
| 7,530,019 B2* | 5/2009 | Kjeldsen | H04N 5/74 715/730 |
| 7,719,568 B2* | 5/2010 | Hung | G06T 3/0062 348/143 |
| 7,954,954 B2 | 6/2011 | Aufranc | |
| 8,013,283 B2* | 9/2011 | Lee | G06F 3/0488 250/208.1 |
| 8,267,523 B2 | 9/2012 | Kondo | |
| 8,274,531 B2* | 9/2012 | Yoneno | G03B 21/14 345/594 |

(Continued)

OTHER PUBLICATIONS

Microsoft Windows 7 OS; Jul. 22, 2009.*

*Primary Examiner* — Bao-Luan Le
(74) *Attorney, Agent, or Firm* — McDonnell Boehnen Hulbert & Berghoff LLP

(57) ABSTRACT

Example embodiments may relate to methods and systems for providing a higher-resolution segment within a larger lower-resolution projection onto a projection surface. For example, the system may receive pose data corresponding to a viewing location relative to the projection surface. The system may then determine, based on the pose data, a target portion of an image frame of image data. As a result, the system may cause a first projector to project at least the target portion onto the projection surface and cause a second projector to project at least a remaining portion of the image frame of the image data onto the projection surface. The projections of the target portion and the remaining portion may collectively provide a complete projection of the image data on the projection surface and a projection-surface resolution of the target portion may be higher than a projection-surface resolution of the remaining portion.

22 Claims, 7 Drawing Sheets

(56) References Cited

U.S. PATENT DOCUMENTS

| | | | |
|---|---|---|---|
| 8,477,241 B2 | 7/2013 | Chang | |
| 8,589,796 B2* | 11/2013 | Kjeldsen | G03B 21/28 715/730 |
| 8,591,039 B2* | 11/2013 | Morrison | G06F 3/0412 348/745 |
| 8,840,250 B1* | 9/2014 | Yao | G01S 17/46 345/633 |
| 8,887,043 B1* | 11/2014 | Pollack | G06F 3/017 345/108 |
| 8,957,964 B2* | 2/2015 | Iyoda | H04N 5/23232 348/143 |
| 9,071,773 B2* | 6/2015 | Oka | H04N 9/3179 |
| 9,167,289 B2* | 10/2015 | Stinson, III | H04N 21/4223 |
| 2004/0036717 A1* | 2/2004 | Kjeldsen | H04N 5/74 715/730 |
| 2005/0116968 A1* | 6/2005 | Barrus | H04N 9/3147 345/698 |
| 2007/0013716 A1* | 1/2007 | Kjeldsen | H04N 5/74 345/594 |
| 2008/0018740 A1* | 1/2008 | Iyoda | H04N 5/23232 348/148 |
| 2008/0143821 A1* | 6/2008 | Hung | G06T 3/0062 348/36 |
| 2008/0218641 A1* | 9/2008 | Kjeldsen | H04N 5/74 348/746 |
| 2009/0085828 A1* | 4/2009 | Lee | G06F 3/0488 345/1.1 |
| 2010/0097393 A1* | 4/2010 | Yoneno | G03B 21/14 345/600 |
| 2010/0103330 A1* | 4/2010 | Morrison | H04N 9/3185 348/744 |
| 2011/0292080 A1* | 12/2011 | Oka | H04N 9/3179 345/634 |
| 2012/0060177 A1* | 3/2012 | Stinson, III | H04N 21/4223 725/12 |

* cited by examiner

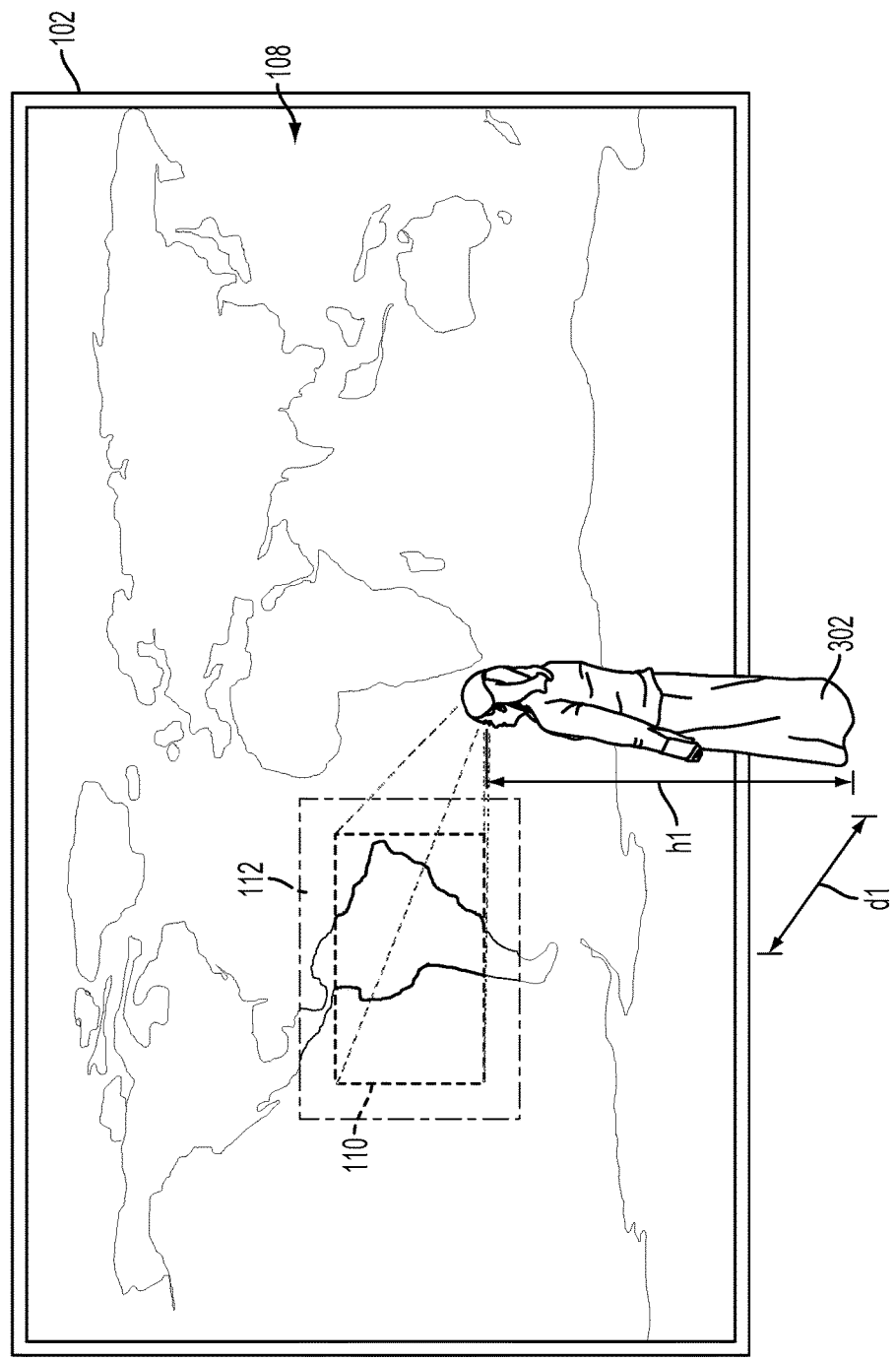

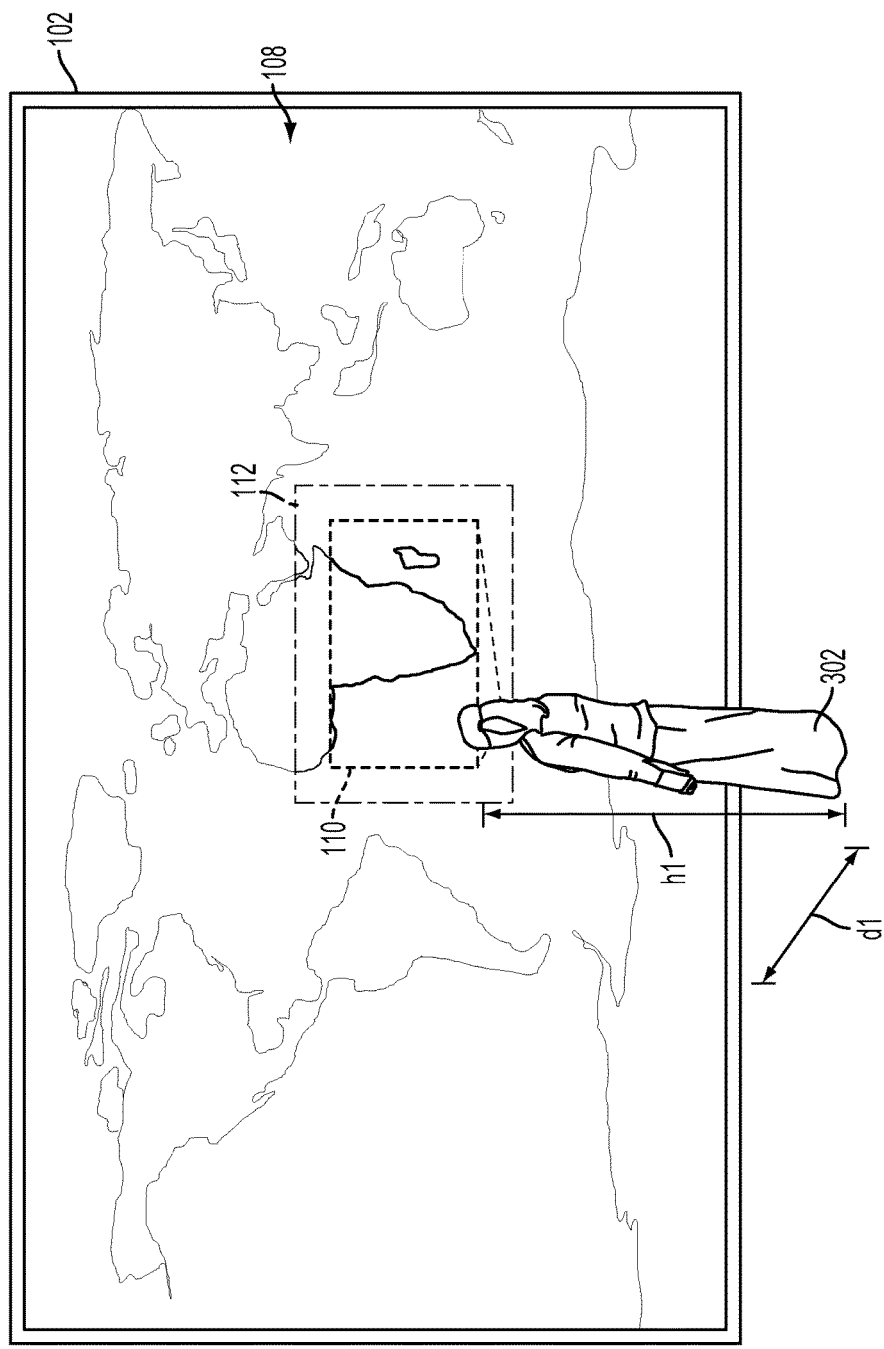

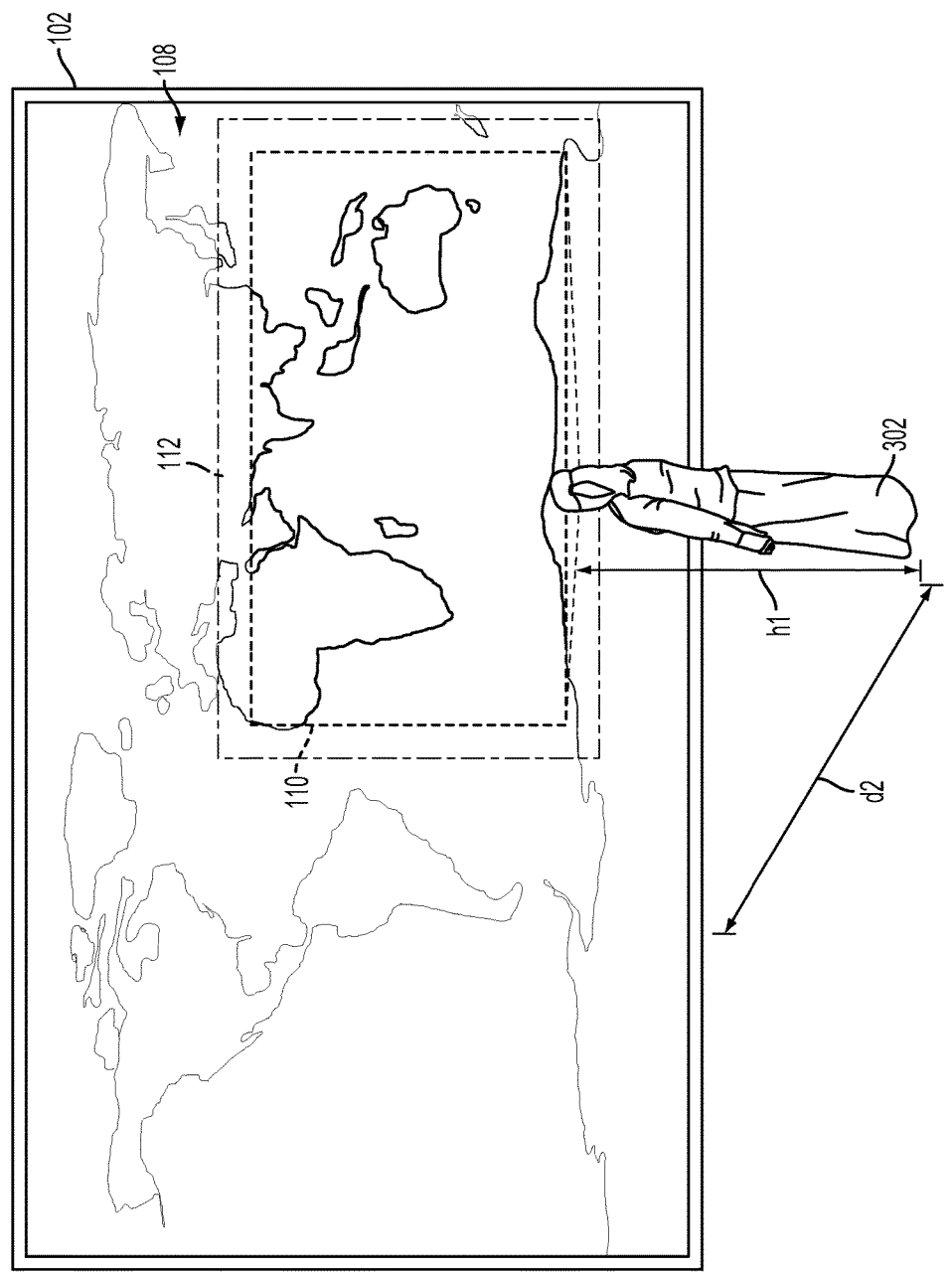

METHODS AND SYSTEMS FOR PROJECTING A TARGET PORTION OF AN IMAGE AT A HIGHER RESOLUTION

CROSS REFERENCE TO RELATED APPLICATION

The present application claims priority to U.S. Provisional patent application Ser. No. 61/993,820 filed on May 15, 2014 and entitled "Projection System and Methods," the entire contents of which are herein incorporated by reference.

BACKGROUND

Unless otherwise indicated herein, the materials described in this section are not prior art to the claims in this application and are not admitted to be prior art by inclusion in this section.

Embodiments of the present invention relate to projection systems used in theaters, homes, shopping malls, museum installations, displays of news articles, and concert venues, among others. Demand for a high quality viewing experience has resulted in a trend of innovation in higher resolution projection systems. For example, projection systems used for projections on large surfaces may suffer from a lower quality viewing experience when a viewer is positioned closer to the large projection surface. As such, advances in automation of the projection systems as well as improved sensing techniques may allow for innovation in enhancing the viewing experience.

SUMMARY

Example embodiments may relate to methods and systems for providing a higher-resolution segment within a larger lower-resolution projection onto a projection surface. For example, the system may receive pose data corresponding to a viewing location relative to the projection surface. The system may then determine, based on the pose data, a target portion of an image frame of image data. As a result, the system may cause a first projector to project at least the target portion onto the projection surface and cause a second projector to project at least a remaining portion of the image frame of the image data onto the projection surface. The projections of the target portion and the remaining portion may collectively provide a complete projection of the image data on the projection surface and a projection-surface resolution of the target portion may be higher than a projection-surface resolution of the remaining portion.

In one aspect, a system is provided. The system includes a plurality of projectors configured to project imagery onto a projection surface, where. the plurality of projectors comprises at least a first projector and a second projector. The system also includes a control system configured to perform functions. The functions include receiving pose data corresponding to a viewing location. The functions also include determining, based on the pose data, a target portion of an image frame of first image data. The functions additionally include causing the first projector to project at least the target portion onto a projection surface. The functions further include causing the second projector to project at least a remaining portion of the image frame of the first image data onto the projection surface, where (i) the projections of the target portion and the remaining portion collectively provide a complete projection of the first image data on the projection surface and (ii) a projection-surface resolution of the target portion is higher than a projection-surface resolution of the remaining portion.

In another aspect, a method is provided. The method involves receiving pose data corresponding to a viewing location, where the viewing location is relative to a projection surface. The method also involves determining, based on the pose data, a target portion of an image frame of first image data. The method additionally involves causing a first projector to project at least the target portion onto the projection surface. The method further involves causing a second projector to project at least a remaining portion of the image frame of the first image data onto the projection surface, where (i) the projections of the target portion and the remaining portion collectively provide a complete projection of the first image data on the projection surface and (ii) a projection-surface resolution of the target portion is higher than a projection-surface resolution of the remaining portion.

In yet another aspect, a non-transitory computer readable medium is provided. The non-transitory computer readable medium has stored therein instructions executable by a control system to cause the control system to perform functions. The functions include receiving pose data corresponding to a viewing location, where the viewing location is relative to a projection surface. The functions also include determining, based on the pose data, a target portion of an image frame of first image data. The functions additionally include causing a first projector to project at least the target portion onto the projection surface. The functions further include causing a second projector to project at least a remaining portion of the image frame of the first image data onto the projection surface, where (i) the projections of the target portion and the remaining portion collectively provide a complete projection of the first image data on the projection surface and (ii) a projection-surface resolution of the target portion is higher than a projection-surface resolution of the remaining portion.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3A illustrates a high-resolution segment projected onto a projection surface and a person at a viewing location relative the projection surface, according to an example embodiment.

FIG. 3B illustrates a change in the person's a viewing angle relative to the projection surface, according to an example embodiment.

FIG. 3D illustrates a change in the person's a viewing angle and a change in the distance of the viewing location relative to the projection surface, according to an example embodiment.

DETAILED DESCRIPTION

Figure 1:
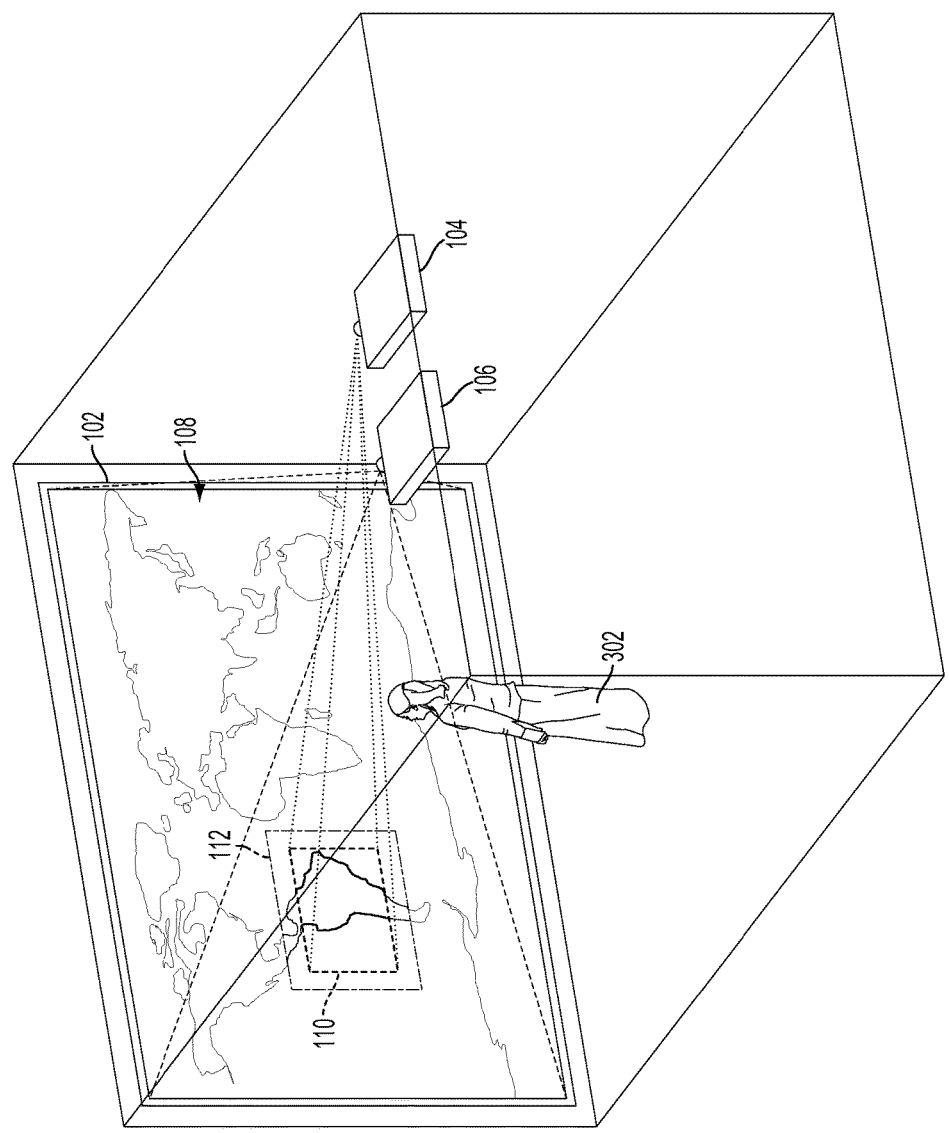
FIG. 1 shows a projection system for projecting a high-resolution segment, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments may take the form of or otherwise relate to an image-projection system with two or more projectors configured to provide at least one higher-resolution segment within a larger lower-resolution projection onto a projection surface. Further, the system may determine the pose of a person viewing the projection surface, and responsively move and/or adjust the higher-resolution segment according to the person's pose.

In an embodiment, a control system may receive pose data corresponding to a viewing location (e.g., from which a viewer is viewing the projection surface). The pose data may include or be used to determine, for example, the distance between a viewing location and the projection surface, the viewing angle with respect to the projection surface (e.g., the direction of a person's gaze with respect to the projection surface), and/or the height of the viewing location. Various adjustments can then be made based on the pose data.

A high-resolution segment of a projection may be adjusted in various ways as a viewer's location and/or viewing angle changes. For example, consider the scenario where a person is close enough to a projection surface that their central field of view only encompasses a portion of the projection surface (i.e., the remaining portion of the surface may be within their peripheral vision and/or completely outside of their field of view). An example system may project an image on the projection surface such that the segment of the projected image within the person's central field of view has a higher resolution than the rest of the image. Further, as a person moves and/or turns their head, a control system may be configured to move the high-resolution segment such that the high-resolution segment remains within the person's central field of view.

Yet further, as the person moves closer to or further from the projection surface, the portion of the projection surface within the person's field of view will decrease or increase, respectively. Accordingly, in a further aspect, an example system may respond to the person moving further from or closer to the projection surface by decreasing or increasing the size of the high-resolution segment of the projection.

II. Illustrative Systems

FIG. 1 shows an example implementation of a projection system configured to provide at least one higher-resolution segment within a larger lower-resolution projection onto a projection surface. In particular, FIG. 1 shows a room with a projection surface 102 mounted on a wall inside the room and a viewer 302 looking at a projected image 108 on the projection surface 102. However, the projection surface 102 may be positioned on a stand or may hang off the ceiling, among other possibilities. Note that the projection surface 102 may take on any size or shape.

Additionally, FIG. 1 shows projectors 104 and 106 mounted on the ceiling and configured to provide a projection of the image 108 onto the projection surface 102. More specifically, as illustrated by the dotted lines, projector 104 may be configured to project a high-resolution segment 110 of the image 108 while projector 106 may be configured to project the remaining portion of the image 108. Note that while various embodiments are described herein in the context of projectors 104 and 106 mounted on the ceiling, embodiments described herein may be implemented in any projector configuration such as rear projection, among others. Further, note that a buffer area 112 is shown at the edge of the high-resolution segment 110. Additional discussion of the buffer area 112 is presented below.

The projectors 104 and 106 may be mounted on a ball mount or another mechanical feature that is operable to rotate and/or move the projectors 104 and 106 such that the projected image 108 remains correctly projected onto the projection surface 102 while allowing movement of the high-resolution segment 110 of the image 108 about the projection surface 102. Additionally or alternatively, the projectors 104 and 106 may include a lens mechanism that is configured to move the respective projected portions of the image 108. Note that while FIG. 1 shows the projectors 104 and 106 mounted on the ceiling, the projectors 104 or 106 may be positioned anywhere. Further, note that in some examples, at least one of projectors 104 and 106 may be mounted on a robotic arm or a 2-axis mount configured to move the projector as discussed above. Other examples and combinations may also be possible.

Figure 2:
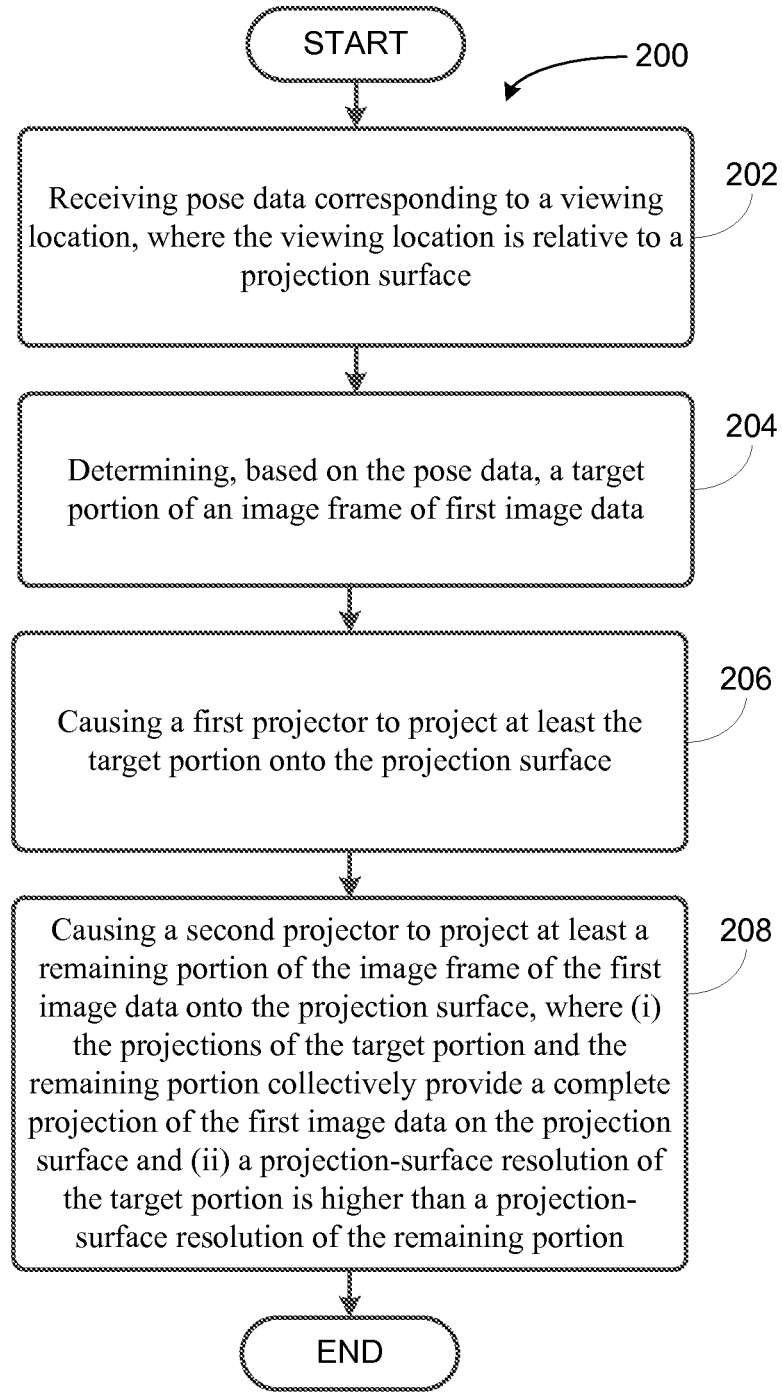
FIG. 2 shows an example flow diagram for projecting a high-resolution segment, according to an example embodiment.

FIG. 2 is a flowchart illustrating a method 200, according to an example embodiment. In particular, method 200 may be implemented provide at least one higher-resolution segment within a larger lower-resolution projection onto a projection surface.

Method 200 shown in FIG. 2 presents an embodiment of a method that can be implemented within an operating environment involving, for example, the projection system of FIG. 1. Method 200 may include one or more operations, functions, or actions as illustrated by one or more of blocks 202-208. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry (e.g., a control system) that is wired to perform the specific logical functions in the process.

To help explain FIG. 2, reference is made below to FIG. 3A, and therefore a brief description of FIG. 3A is now provided. FIG. 3A shows a scenario in which an example embodiment may be implemented. The example system may be implemented within an operating environment involving, for example, the projection system of FIG. 1. In particular, FIG. 3A shows the large projection surface 102 and the image 108 projected onto the large projection surface 102. As discussed above, projector 104 (not shown in FIG. 3A) may be configured to project the high-resolution segment 110 (e.g., a target or high-resolution portion) of the image 108 onto the projection surface 102. The buffer area 112 is shown at the edge of the high-resolution segment 110. Additionally, as discussed above, projector 106 (not shown in FIG. 3A) may be configured to project the remainder of the image 108 onto the projection surface 102, such that the projections from projectors 104 and 106 collectively provide a complete projection (e.g., a complete image, or complete video frames) on the projection surface 102.

FIG. 3A also shows a viewer 302 positioned a distance d1 away from the projection surface 102. Yet Further, FIG. 3A shows a corresponding height h1 of the viewer 302 (e.g., measured from the ground to the viewer 302's eyes) as well as the viewer 904's viewing angle and field of view.

At block 202, method 200 involves receiving pose data corresponding to a viewing location, where the viewing location is relative to a projection surface.

A control system (not shown) may receive pose data (e.g., position information) indicating the position of viewer 302 at a viewing location relative to the projection surface 102. The pose data may include the distance d1 from the projection surface 102 and/or the height h1 associated with the viewer 302. As a specific example, a control system may be provided with or otherwise determine the height of the viewer 302's eyes relative to the ground, the viewer 302's location with respect to the projection surface 102 (e.g., using (x, y, z) coordinates), and the viewing angle of the viewer 302's eyes. With this information, the control system may determine both: (a) a location of focus on the projection surface 102 (e.g., the location where the viewer 302's line-of-sight intersects the projection surface 102) and (b) the distance between the viewer 302's eyes and the location of focus on the projection surface 102.

The system may have embedded information related to the projection surface 102 and a desired visual representation. A control system may accordingly be programmed to automatically adjust a graphical output from the projectors 104 and 106 to create the desired visual presentation, given the spatial position of the projection surface 102 and the perspective that viewer 302 is determined to have of the projection surface 102 (e.g., as may be determined based at least in part by sensor data). Further, the control system may be configured to adjust the graphical output in real-time, as the viewer 302's perspective of the projection surface 102 changes.

Various mechanisms and combination of devices may be used to determine the viewer 302's pose. For example, an accelerometer may be used to measure the acceleration of the viewer 302, a gyroscope may be used to determine the viewer 302's orientation, a magnetometer may be used to determine the viewer 302's position, and an altimeter may be used to measure the viewer 302's height h1. Additional sensors in the environment, such as outward facing sensors (or cameras) positioned on the projection surface 102, may also be used. For instance, an outward facing sensor may be configured as an eye tracker for tracking the viewer 302's eye movement (i.e., to determine a viewing angle), as well as determine the viewer 302's pose and refine measurements of distance d1 based on a determined line-of-sight for the viewer 302, among other examples.

In some examples, a person may wear or hold a wearable computing device (WCD). The WCD may generate position data, location data, and/or movement data that indicates or can be used to determine the pose of the person. The WCD may generate and send such data to the control system in real-time. The control system can therefore determine the viewer 302's pose, and provide real-time control of the projections onto the projection surface 102 such that projection mapping is updated according to the viewer 302's pose.

More specifically, while wearing a WCD, the viewer 302 may move with respect to projection surface 102. The WCD may include sensors that provide data that is indicative of a location, orientation, and/or movement of the WCD (in addition or alternatively to the sensors described above). Such data can thus be used as a proxy of the location and/or pose of viewer 302. Accordingly, while viewer 302 is a wearer of the WCD, spatial coordinates corresponding to viewer 302 may be determined based on sensor data from the WCD. The spatial coordinates may be provided by a control system (e.g., a master control system, a computer). As part of the system, the image 108 (i.e., the segment 110 and the remaining portion of the image 108) projected onto the projection surface 102 may be created based on the known information of the movement of the WCD through the set of spatial coordinates. Note that the WCD may also be used for eye tracking, among other examples.

Further, a control system may be configured to receive real-time data indicating the pose of the WCD. As the real-time signal indicating the pose of the device is received, the control system or another system may generate projection content that is directed to the perspective of the projection surface 102 from the WCD. As such, the perspective to which the graphic content is directed may vary in real-time based on the pose of the device. That is, the perspective to which the graphic content may be varied in real-time as the viewer 302's perspective of projection surface 102 changes due to movement of the viewer 302 (and/or due to movement of the projection surface 102).

In one example, the WCD is a head-mountable device (HMD). However, other types of wearable computing devices may be utilized, such as a smartwatch, for instance. Further, a device such as mobile phone, tablet, or even a laptop computer may function as WCD if viewer 302 carries such a device with them while moving about (e.g., in their pocket or in their arms). Other types of wearable computing devices are also possible.

In an illustrative embodiment, the WCD may include one or more sensors that provide data that indicates or can be used to determine the location and/or the pose of viewer 302. Such sensors may include a GPS system, accelerometer(s), gyroscope(s), and/or magnetometer(s), among other possibilities. The WCD and/or the control system may use data from such sensors to determine the location and/or orientation of the WCD, which in turn may be used to determine a location and/or orientation of the viewer 302 with respect to the projection surface 102.

Note that determining the location and/or the pose of viewer 302 with respect to a projection surface 102 may involve determining the location of the WCD with respect to the wearer's head or eyes. Accordingly, in some embodiments, the WCD may determine and/or provide a control system with other information to facilitate determining the location and/or the pose of viewer 302. Such information may include the type of WCD (e.g., wearable device, mobile phone, etc.), a location on the viewer 302's body and/or the manner in which the WCD is being worn (e.g., on the person's head, on the person's waist, in the person's pocket), for example. Further, in the event that the user has opted to make such information available, the WCD may determine and/or provide a control system with data indicating a person's body size and/or shape, which may be helpful in determining how the person's head and/or eyes are positioned and/or oriented with respect to the WCD. Other examples may also be possible.

At block 204, method 200 involves determining, based on the pose data, a target portion of an image frame of first image data.

As mentioned above, projector 104 may be configured to project a high-resolution segment 110 of an image 108 onto the projection surface 102. In particular, the projector 104 may be configured to project the segment 110 such that the projection-surface resolution of the segment 110 is greater than the projection-surface resolution of the remainder of the image 108. More specifically, the control system may receive information from projector 106, where the information is associated with the projection-surface resolution of the remainder of the image 108. Subsequently, the control system may be configured to send instructions to the projector 104 to project the segment 110 at a projection-surface resolution that is higher than the projection-surface resolution of the remainder of the image 108.

Alternatively, the projection-surface resolution of the segment 110 may be the same as the projection-surface resolution of the remainder of the image 108. However, in this case, the projection of segment 110 may have a higher pixel density than the projection of the remainder of the image 108 (e.g., due to a difference in projection size). As a result, the image quality of the segment 110 may be higher than the image quality of the remainder of the image 108 due to the difference in pixel density.

As mentioned above, the high-resolution segment 110 of the projected image 108 may be customized for the viewer 302. In particular, the projector 104 may include mechanical or optical features that allow for the size of the high-resolution segment 110 to be scaled and/or moved on the projection surface 102. Alternatively, an intermediary feature (e.g., including a mirror galvanometer and/or other optical elements) between the projector 104 and the projection surface 102 may be controlled in order to scale and/or move the high-resolution segment 110 on the projection surface 102. In either case, the control system may be configured to move and/or scale the high-resolution segment 110 when the viewer 302 changes position (e.g., pose) relative to the projection surface 102.

In example embodiments, the projected image 108 data may be a still image, a sequence of still images (e.g., a slideshow), or video. In the case of video, the control system may determine a target portion of each video frame, so that the high-resolution segment 110 of the projected video can be scaled and/or moved on the projection surface 102 as a viewer 302's location and/or viewing angle changes with respect to the projection surface 102.

As mentioned above, the pose data corresponding to a viewing location may be determined in various ways. For example, the viewer 302 could attach sensors to their body and/or wear a wearable computing device (e.g., the WCD) with such sensors, which can provide data indicating the wearer's location and/or movements. Further, other sensors such as proximity sensors, cameras, etc., may be arranged in a viewing environment around the projection surface 102. Data from such sensors may accordingly be utilized to detect the viewer 302, and to determine the viewer 302's location (e.g., distance d1) and/or the viewing angle with respect to the projection surface 102. Subsequently, based on the data, the control system may be configured to determine a size and/or a location of the high-resolution segment 110 within the image 108 projected on the projection surface 102.

Note that while example embodiments may be used to move and/or scale a high-resolution segment 110 of a projection in accordance with a human's viewing position and/or viewing angle, applications of example embodiments are not limited to humans. Example systems may be arranged to follow the location of any object or thing, or even a location that exists only in data (e.g., as a sequence of 3D coordinates in a volume).

At block 206, method 200 involves causing a first projector to project at least the target portion onto the projection surface.

In an example embodiment, the control system may be configured to control the projection of the high-resolution segment 110 (i.e., the target portion of the image 108) by sending instructions to the projector 104. In particular, the control system may determine a location on the projection surface 102 that corresponds to the location of the target portion within the image 108. Consequently, the control system may control the projection of the high-resolution segment 110 such that the segment 110 is projected onto the determined location on the projection surface 102.

The pose data corresponding to a viewing location may change as the viewer 302 changes the distance between the viewing location and the projection surface 102, the height of the viewer 302, and/or the viewing angle at the viewing location, among other possibilities. In particular, the pose data may initially indicate a first pose and the high-resolution segment 110 may be determined based on the first pose as discussed above. Subsequently, the control system may analyze the pose data and detect a change to from the first pose of viewer 302 to a second pose of viewer 302. As a result, the projection of the high-resolution segment 110 may update based on the detected change.

Figure 3C:
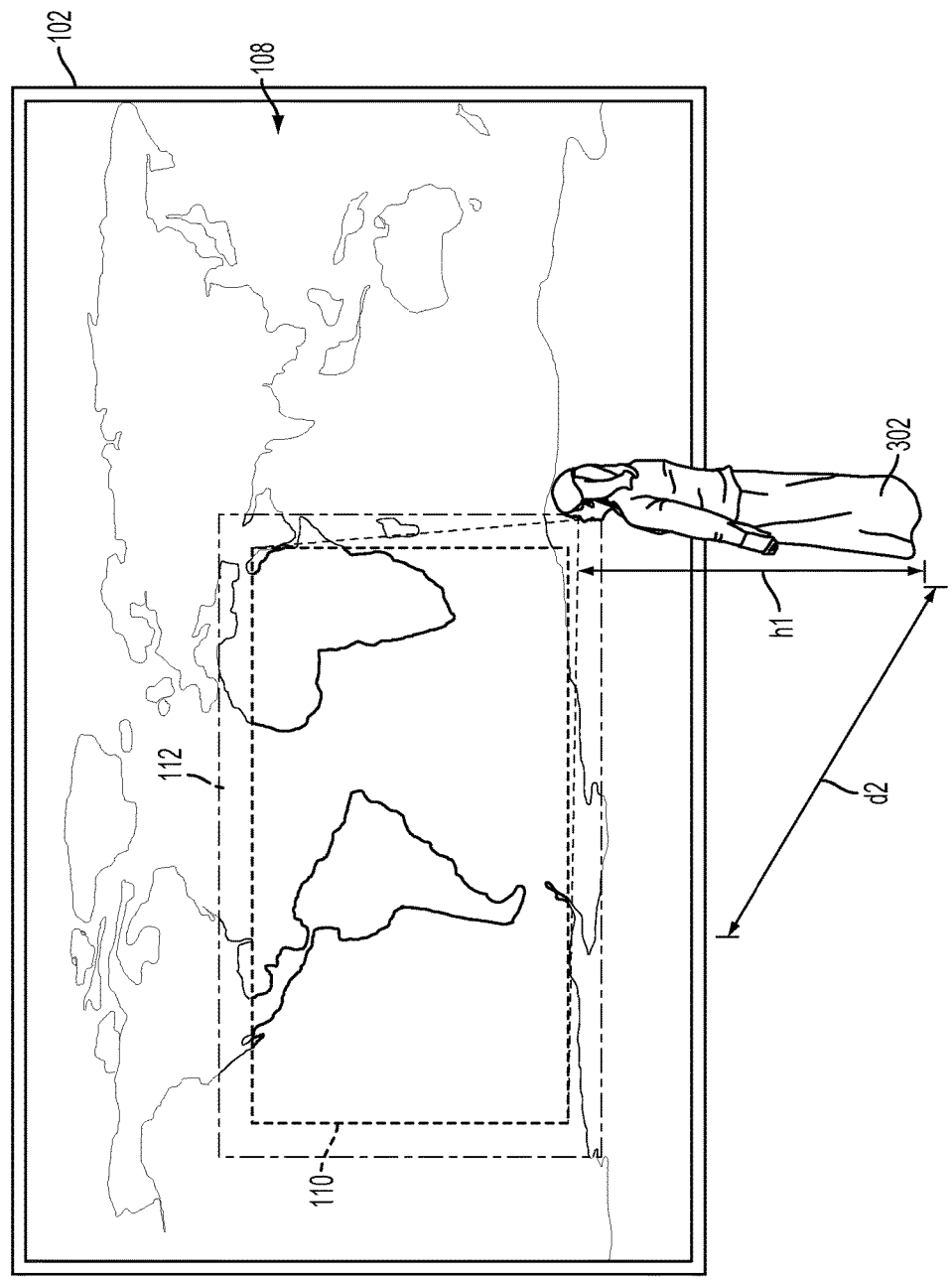
FIG. 3C illustrates a change in the distance of the viewing location relative to the projection surface, according to an example embodiment.

To illustrate, consider FIGS. 3B-3D showing how the high-resolution segment 110 may update (e.g., move on the projection surface 102) as the viewer 302's pose changes over time. FIG. 3B shows the viewer 302 positioned at the same distance d1 and height h1 shown in FIG. 3A. However, in this case, the viewer 302's viewing angle has changed such that the viewer 302's line-of-sight intersects at a different part of the projection surface 102. Based on the change in the viewer 302's viewing angle, the control system may determine an updated location for the high-resolution segment 110 and thereby control the projection such that the high-resolution segment 110 is projected on the projection surface 102 at the updated location.

Additionally, as shown in FIG. 3B, the projection-surface size of the segment 110 may not change with the change in the viewing angle. However, in some cases, the projection-surface size of the segment 110 may change to correspond with the change in the viewing angle. This may occur, for example, in a situation where the viewer 302 is positioned near the far left of the projection surface 102 and changes the viewing angle such that the viewer 302's line-of-sight intersects the projection surface 102 at a location that is at the far right (i.e., further away from the viewer 302 than the original location of the high-resolution segment 110). In other words, the projection-surface size of the segment 110 may increase or decrease proportionally as the distance changes, due to the change in viewing angle, between the viewer 302's eyes and the location at which the viewer 302's line-of-sight intersects the projection surface 102.

FIG. 3C shows the viewer 302 positioned at the same height h1 and the same viewing angle shown in FIG. 3A. However, in this case, the viewer 302's distance has changed such that new pose data indicates an increased distance d2 with respect to the projection surface 102. Based on the increased distance d2, the control system may determine an updated projection-surface size for the high-resolution segment 110 and thereby control the projection such that the high-resolution segment 110 is projected on the projection surface 102 at the updated projection-surface size. In this case, the projection-surface size of the segment 110 may increase proportionally as the distance changes between the viewer 302's viewing location and the projection surface 102 from distance d1 to distance d2. However, the projection-surface size of the segment 110 may decrease proportionally when the viewer 302's distance away from the projection surface 102 decreases.

FIG. 3D shows the viewer 302 positioned at the same height h1 as shown in FIG. 3A. However, in this case, the viewer 302's distance has changed such that new pose data indicates an increased distance d2 with respect to the projection surface 102. Additionally, the viewer 302's viewing angle has changed such that the viewer 302's line-of-sight intersects at a different part of the projection surface 102. Based on the increased distance d2 and the change in viewing angle, the control system may determine an updated projection-surface size for the high-resolution segment 110 as well as an updated location for the high-resolution segment 110. Therefore, the control system may control the projection such that the high-resolution segment 110 is projected on the projection surface 102 at the updated projection-surface size and at the updated location.

In some cases, additionally or alternatively, the viewer 302's viewing height may change from height h1 to a new height h2 (not shown in FIGS. 3A-3D). For example, the viewer 302 may be positioned at the same distance d1 and at the same viewing angle as shown in FIG. 3A. However, the viewer 302 may, for example, sit down on the ground, which may result in the change in height. Based on the new height h2, the control system may determine an updated location for the high-resolution segment 110. As a result, the control system may control the projection such that the high-resolution segment 110 is projected on the projection surface 102 at the updated location, where the updated location may change proportionally to the change in viewing height of the viewer 302. Other examples and combinations may also be possible.

In an example embodiment, the control system may calculate or predict a future pose of viewer 302. Prediction of a future pose may allow the control system to determine an updated projection-surface size and/or an updated location for the high-resolution segment 110 at a future point in time. A future pose of viewer 302 may be determined based on historical movement data and/or anticipated position (e.g., based on direction of motion of the viewer's body and/or head), among other possibilities. Such predictive reposition of the high-resolution segment 110 may allow for reduction of latency and/or reduction of aliasing, among others.

At block 208, method 200 involves causing a second projector to project at least a remaining portion of the image frame of the first image data onto the projection surface, where (i) the projections of the target portion and the remaining portion collectively provide a complete projection of the first image data on the projection surface and (ii) a projection-surface resolution of the target portion is higher than a projection-surface resolution of the remaining portion.

As mentioned above, projector 104 may project the high-resolution segment 110 of the image 108 onto the projection surface 102. Additionally, projector 106 may project the remainder of the image 108 onto the projection surface 102, such that the projections from the projectors 104 and 106 collectively provide a complete projection on the projection surface 102 and such that the projection-surface resolution of the segment 110 is higher than the projection-surface resolution of the remaining portion. More specifically, the remaining portion of the image 108 may include at least a portion of the image 108 that is outside the high-resolution segment 110.

In an example embodiment, when change is detected in the pose data corresponding to the viewer 302, the control system may re-determine the high-resolution segment 110 and update the projection of the remaining portion accordingly. In particular, the control system may cause the projector 104 to project the re-determined segment 110 onto the projection surface 102 and cause the projector 106 to project the updated remaining portion of the image 108 onto the projection surface 102. The re-determined segment 110 and the updated remaining portion may be projected such that the projections continue to collectively provide a complete projection of the image 108 onto the projection surface 102.

Figure 4:
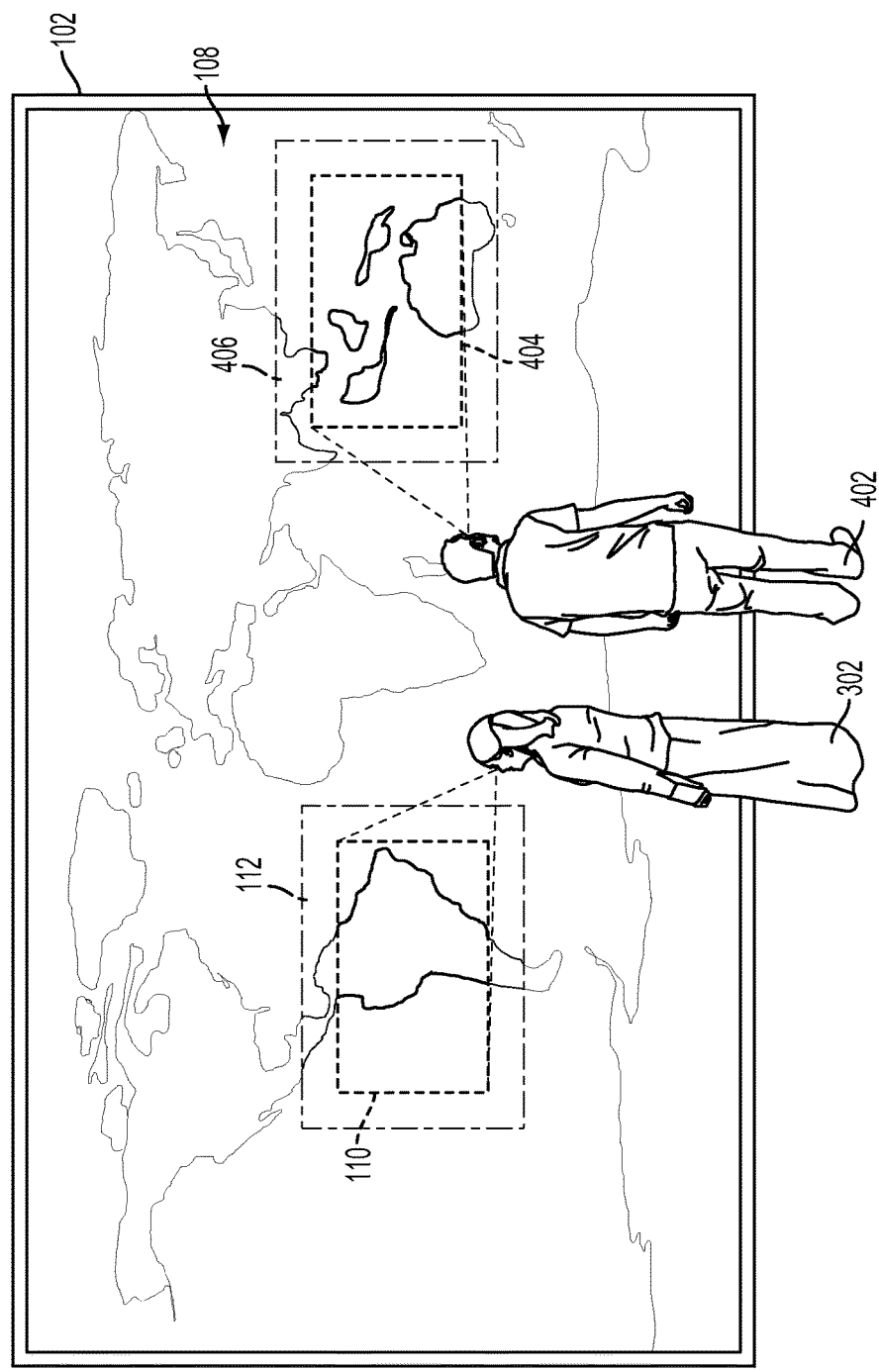
FIG. 4 illustrates two high-resolution segments projected onto a projection surface, according to an example embodiment.

In some embodiments, multiple high-resolution projection systems may be utilized. To illustrate, consider FIG. 4 showing a second viewer 402 viewing the image 108 on the projection surface 102 in addition to viewer 302 as first presented in FIG. 3A. In particular, projector 104 may be configured to project the high-resolution segment 110 corresponding to viewer 302. Additionally, another projector (not shown) may be configured to project a high-resolution segment 404 corresponding to the second viewer 402. Further, projector 106 may be configured to project the remaining portion of the image 108 such that all the projections collectively provide a complete projection of the image 108.

In general, the example system may provide multiple dynamic high-resolution segments of the image 108 on the same projection surface 102. More specifically, when there are two viewers (e.g., multiple viewing locations), one high-resolution projection system may be dedicated to each viewer, such that a separate high-resolution segment follows the viewing location and viewing angle of each viewer. As such, the high-resolution segments 110 and 404 may scale in size and/or move on the projection surface 102 independently from one another.

In some cases, the projections of the high-resolution segments 110 and 404 may at least partially overlap when the viewers 302 and 402 are looking at a similar portion of the image 108 projected on the projection surface 102. In such cases, the control system may send instructions to one or more of the projection systems to adjust the projections of segments 110 and 404 based on the overlap. In one example, the control system may detect the overlapping portion and responsively send instructions to projector 104 to adjust the projection of segment 110 by temporarily stopping projection of the overlapping part of segment 110 while continuing projection of the remainder of the segment 110.

In another example, the control system may detect the overlapping part and responsively send instructions to the other projector (i.e., the projector configured to project segment 404) to adjust the projection of segment 404 by temporarily stopping projection of the overlapping part of segment 404 while continuing projection of the remainder of the segment 404. Alternatively, the control system may not adjust the projections of the high-resolution segments 110 and 404 when an overlap is detected. Other examples may also be possible.

In a further aspect, a control system may control the projections so as to blend the high-resolution segment projection(s) (e.g., 110 and/or 404) and the remaining portion of the image 108 (i.e., a lower resolution projection) in hopes of avoiding a noticeable transition at the edge of the high-resolution segment projection(s). For example, referring to FIG. 3A, the control system may determine a blend or buffer area 112 at the edge of the high-resolution segment 110. The image 108 data may be formatted such that the buffer area 112 is included in both the projection of the high-resolution segment 110 and the projection of the remaining portion of the image 108. In other words, the projections from both projectors 104 and 106 may overlap in the buffer area 112. Note that the system may not include the buffer area 112; however, the buffer area 112 may significantly improve the viewing experience.

Projector 104 may gradually decrease a luminosity of the high-resolution segment 110 in the buffer area 112 (e.g., such that luminosity of projector 104 decreases from a higher luminosity at an inner edge of the buffer area 112 to a lower luminosity at the outer edge of the buffer area 112). In addition, projector 106 (e.g., configured to project the remaining portion of the image 108) may gradually decrease luminosity in the opposite direction across the buffer area 112 (e.g., such that the luminosity of projector 106 decreases from a higher luminosity at the outer edge of the buffer area 112 to a lower luminosity at the inner edge of the buffer area 112).

As a specific example, projector 104 may gradually decrease luminosity from 100% to 0% moving from the inner to the outer edge of buffer area 112, while projector 106 may increase luminosity from 0 to 100% from the inner edge to the outer edge of buffer area 112. Since the luminosity of projectors 104 and 106 may differ, and since the luminosity may be additive in areas where the projections overlap, such a buffer area 112 may help to provide a more consistent appearance, without any dramatic changes in luminosity. Note that such a configuration may also apply to a second buffer area 406 associated with a second high-resolution segment 404. Other examples may also be possible.

In an example embodiment, the projection angle of projector 104 may change in order to move and/or scale the high-resolution segment 110 of the projected image 108 data. When the projector 104 is angled relative to the projection surface 102, this may distort the projected image 108 (e.g., resulting in a "keystone effect"). Accordingly, an example system may use various techniques to adjust the size and/or shape of the high-resolution segment 110 in an effort to reduce, and hopefully eliminate, the keystone effect. For instance, various techniques may involve the projector 104 positioned in a gantry configuration to allow for repositioning of the projector 104 (e.g., along X and Y coordinates) such that a perpendicular projection is emitted relative to the projection surface 102 on an as-needed basis (or a continuous basis), thereby reducing the keystone effect. Additionally or alternatively, a moving mirror (or a system of moving mirrors) may be used to redirect the emitted projection to account for the keystone effect. In another example, if projector 104 is mounted on a robotic arm, the reach of the robotic arm may allow for the projector lens to be kept parallel to the projection surface 102 as the robotic arm moves the projector 104, thereby avoiding the keystone effect. Other examples may also be possible.

In some cases, the system may optimize keystone correction based on the distance between the viewer and the projection surface 102 to maintain optimal resolution. For example, the system may optimize the amount of keystone correction due to lens imperfection (e.g., color, focus, geometric (barrel) distortion, and/or luminosity degradation) based on the distance. In other words, the system may adjust the amount keystone correction and/or the amount of lens correction depending on the viewer's position.

Additionally, the control system may synchronize the operation of projectors 104 and 106. For example, the control system may synchronize the frequency (Hz) and phase of the projectors 104 and 106. More specifically, the control system may include a master clock and/or have access to an external clock or a system, which provides timing information that is used to maintain synchronization between the projectors 104 and 106, and/or other devices. Such synchronization may help to reduce, and hopefully eliminate, mismatch effects in the resulting projections so that the projected images appear synchronized on the projection surface 102. Note, however, that such benefits are not required, and other benefits are also possible.

In an example embodiment, the control system may determine one or more projection parameters for the operation of projectors 104 and 106. The one or more projection parameters may indicate one or more of: (a) a frame rate, (b) a phase offset, and (c) a trigger time or start time, among other possibilities. The control system may then generate projector control signals based on the one or more projection parameters. The control signal may then be sent to the projectors 104 and 106 to help synchronize their operation. In particular, the projector control signals may be electrical signals that are sent by the control system to the video card or video cards rendering the content that is projected by projectors 104 and 106. Such control signals may be sent to projectors 104 and 106 using various types of interfaces, such as a serial interface, a web interface, and various other types of electrical interfaces, among other possibilities.

In an illustrative embodiment, the one or more projection parameters may indicate a frame rate to one of the projectors, such that both projectors 104 and 106 are projecting image 108 data onto projection surface 102 at the same frame rate. Further, the one or more projection parameters may indicate a phase offset or offsets, and/or a trigger time or times, to one of projectors 104 or 106 to account for differences in delay times between the signal paths. As such, projectors 104 and 106 may be synchronized by periodically triggering the projections at the same rate, as projectors 104 and 106 refresh the image 108 data that is projected onto the projection surface 102, and by aligning the phases of the projections.

Further, the control system may adjust the luminance of the high-resolution segment 110 based on the distance between the viewer 302 and the projection surface 102. In particular, the luminance decreases as a function of distance squared. As such, the control system may adjust the luminance of the high-resolution segment 110 based on distance to, for example, provide a constant-luminance experience as the viewer 302 moves relative to the projection surface 102.

Other image-processing features may also be possible. For example, the image 108 data for the high-resolution segment 110 may be processed to compensate for moiré. As another example, anti-aliasing processes may be applied in the buffer area 112. Other examples are also possible.

The embodiments and techniques discussed above may be implemented in a rear projection configuration (i.e., projectors positioned behind the projection surface). Such a configuration may be desirable for eliminating interference of the projection onto the projection surface by one or more viewers positioned between the projection system and the projection surface. For instance, an example configuration may include a first rear projector used for projecting the remaining portion of the image 108 and a second rear projector used for projecting the high-resolution segment 110.

In this arrangement, the rear projectors may be mounted on the ceiling or positioned in a gantry configuration, among other options. In one example, both rear projectors may be mounted on the ceiling. In another example, both rear projectors may be positioned in a gantry configuration. In yet another example, a first rear projector may be positioned in a gantry configuration and a second rear projector may be mounted on the ceiling. Other examples may also be possible.

In some cases, one of the projectors may be a rear projector while the other projector may be a front projector (i.e., a projector positioned in front of the projection surface as shown in FIG. 1). In this case, the rear projector may project the high-resolution segment 110 while the front projector may project the remaining portion of the image 108. Alternatively, the rear projector may project the remaining portion of the image 108 while the front projector may project the high-resolution segment 110. Note that any number of projectors may be used in such rear projection configurations. Other examples and combinations may also be possible.

V. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A system comprising:
a plurality of projectors configured to project imagery, wherein the plurality of projectors comprises at least a first projector and a second projector; and
a control system configured to:
receive predefined image content to be projected by the plurality of projectors, wherein the predefined image content includes one or more predefined images;
receive pose data corresponding to a viewing location;
determine that the pose data is indicative of a first pose;
determine, based on the first pose, a first target portion of a first predefined image from among the one or more predefined images;
cause the first projector to project at least the first target portion onto a projection surface;
cause the second projector to project onto the projection surface at least a first remaining portion of the first predefined image, wherein (i) the first remaining portion is a portion that is at least partially different from the first target portion, (ii) the projections of the first target portion and the first remaining portion collectively provide on the projection surface a complete projection of the first predefined image, and (iii) a projection-surface resolution of the first target portion is higher than a projection-surface resolution of the first remaining portion;
subsequently determine that the pose data is indicative of a second pose;
determine, based on the second pose, a second target portion of a second predefined image from among the one or more predefined images;
cause the first projector to project at least the second target portion onto the projection surface; and
cause the second projector to project onto the projection surface a second remaining portion of the second predefined image, wherein (i) the second remaining portion is a portion that is at least partially different from the second target portion, (ii) the projections of the second target portion and the second remaining portion collectively provide on the projection surface a complete projection of the second predefined image, and (iii) a projection-surface resolution of the second target portion is higher than a projection-surface resolution of the second remaining portion.

2. The system of claim 1,
wherein the first remaining portion comprises at least a portion of the first predefined image that is outside of the first target portion, and
wherein the second remaining portion comprises at least a portion of the second predefined image that is outside of the second target portion.

3. The system of claim 1, wherein pose data indicates one or more of: (a) distance between the viewing location and the projection surface, (b) a viewing orientation with respect to the projection surface, and (c) a height of the viewing location.

4. The system of claim 1, wherein the control system is further configured to:
determine, based on the pose data, a distance between the viewing location and the projection surface;
determine a size of the first target portion based on the distance between the viewing location and the projection surface; and
control the projection of the first target portion such that the first target portion is projected onto the projection surface in accordance with the determined size.

5. The system of claim 1, wherein the control system is further configured to:
determine, based on the pose data, a distance between the viewing location and the projection surface and a viewing angle at the viewing location; and
determine, based at least in part on the determined distance and the determined viewing angle, a location of the first target portion within the first predefined image.

6. The system of claim 1, wherein the control system is further configured to:
determine a location on the projection surface that corresponds to a location of the first target portion within the first predefined image; and
control the projection of the first target portion such that the first target portion is projected onto the determined location on the projection surface.

7. The system of claim 1, wherein the first predefined image and the second predefined image are the same predefined image from among the one or more predefined images.

8. The system of claim 7, wherein the first target portion determined based on the first pose is different from the second target portion determined based on the second pose.

9. The system of claim 1, wherein the projection of the first target portion has a first projection-surface size, wherein the control system being configured to subsequently determine that the pose data is indicative of a second pose comprises the control system being configured to analyze the pose data to detect a change from the first pose to the second pose, wherein the change from the first pose to the second pose comprises a change in distance between the viewing location and the projection surface, and wherein, in order to cause the first projector to project at least the second target portion onto the projection surface, the control system is configured to:
determine a second projection-surface size in accordance with the change in distance; and
control the projection of the second target portion such that the second target portion is projected onto the projection surface with the second projection-surface size.

10. The system of claim 1, wherein the projection of the first target portion is projected to a first location on the projection surface, wherein the control system being configured to subsequently determine that the pose data is indicative of a second pose comprises the control system being configured to analyze the pose data to detect a change from the first pose to the second pose, wherein the change from the first pose to the second pose comprises a change to at least one of: (a) viewing distance between the viewing location and the projection surface and (b) viewing angle at the viewing location, and wherein, in order to cause the first projector to project at least the second target portion onto the projection surface, the control system is configured to:
determine, based at least in part on the change to at least one of the viewing distance and the viewing angle, a second location on the projection surface; and
control the projection of the second target portion such that the second target portion is projected to the second location on the projection surface.

11. The system of claim 1, wherein the control system is further configured to:
predict a change from the second pose to a third pose at a future time;
in response to the predicted change from the second pose to the third pose, determine, based on the third pose, a third target portion of a third predefined image from among the one or more predefined images;
at the future time, cause the first projector to project at least the third target portion onto the projection surface; and
at the future time, cause the second projector to project onto the projection surface a third remaining portion of the third predefined image, wherein (i) the third remaining portion is a portion that is at least partially different from the third target portion, (ii) the projections of the third target portion and the third remaining portion collectively provide on the projection surface a complete projection of the third predefined image, and (iii) a projection-surface resolution of the third target portion is higher than a projection-surface resolution of the third remaining portion.

12. The system of claim 1, wherein the control system is further configured to determine a buffer area in the first predefined image frame, wherein the first target portion and the first remaining portion overlap in the buffer area.

13. The system of claim 12, wherein the control system is further configured to:
cause the first projector to decrease a luminosity across the buffer area, such that luminosity of the first projector decreases from a higher luminosity at an inner edge of the buffer area to a lower luminosity at an outer edge of the buffer area; and
cause the second projector to decrease the luminosity across the buffer area, such that luminosity of the second projector decreases from a higher luminosity at the outer edge of the buffer area to a lower luminosity at the inner edge of the buffer area.

14. The system of claim 1, wherein the control system is configured to respectively control the projections of the first and second target portions by sending control instructions to the first projector.

15. The system of claim 1,
wherein the first predefined image is different from the second predefined image.

16. The system of claim 1, further comprising an optical system arranged between the first projector and the projection surface, wherein the optical system is configured to adjust the projection of the first target portion onto the projection surface, and wherein the control system is configured to control the projection of the first target portion, at least in part, through control of the optical system.

17. The system of claim 1, wherein the plurality of projectors comprises three or more projectors, and wherein the control system is configured to:
receive view data corresponding to two or more viewing poses;
determine a respective target portion of a third predefined image, from among the one or more predefined images, for each viewing pose; and
control two or more of the projectors such that a different projector emits a projection of each respective target portion onto the projection surface.

18. A method comprising:
receiving predefined image content to be projected, wherein the predefined image content includes one or more predefined images;
receiving pose data corresponding to a viewing location, wherein the viewing location is relative to a projection surface;
determining that the pose data is indicative of a first pose;
determining, based on the first pose, a first target portion of a first predefined image from among the one or more predefined images;
causing a first projector to project at least the first target portion onto the projection surface;
causing a second projector to project onto the projection surface at least a first remaining portion of the first predefined image, wherein (i) the first remaining portion is a portion that is at least partially different from the first target portion, (ii) the projections of the first target portion and the first remaining portion collectively provide on the projection surface a complete projection of the first predefined image, and (iii) a projection-surface resolution of the first target portion is higher than a projection-surface resolution of the first remaining portion;
subsequently determining that the pose data is indicative of a second pose;
determining, based on the second pose, a second target portion of a second predefined image from among the one or more predefined images;
causing the first projector to project at least the second target portion onto the projection surface; and
causing the second projector to project onto the projection surface a second remaining portion of the second predefined image, wherein (i) the second remaining portion is a portion that is at least partially different from the second target portion, (ii) the projections of the second target portion and the second remaining portion collectively provide on the projection surface a complete projection of the second predefined image, and (iii) a projection-surface resolution of the second target portion is higher than a projection-surface resolution of the second remaining portion.

19. The method of claim 18,
wherein the first remaining portion comprises at least a portion of the first predefined image that is outside of the first target portion, and
wherein the second remaining portion comprises at least a portion of the second predefined image that is outside of the second target portion.

20. The method of claim 18, wherein pose data indicates one or more of: (a) distance between the viewing location and the projection surface, (b) a viewing orientation with respect to the projection surface, and (c) a height of the viewing location.

21. A non-transitory computer readable medium having stored therein instructions executable by a control system to cause the control system to perform functions comprising:
receiving predefined image content to be projected, wherein the predefined image content includes one or more predefined images;
receiving pose data corresponding to a viewing location, wherein the viewing location is relative to a projection surface;
determining that the pose data is indicative of a first pose;
determining, based on the first pose, a first target portion of a first predefined image from among the one or more predefined images;
causing a first projector to project at least the first target portion onto the projection surface;
causing a second projector to project onto the projection surface at least a first remaining portion of the first predefined image, wherein (i) the first remaining portion is a portion that is at least partially different from the first target portion, (ii) the projections of the first target portion and the first remaining portion collectively provide on the projection surface a complete projection of the first predefined image, and (iii) a projection-surface resolution of the first target portion is higher than a projection-surface resolution of the first remaining portion;
subsequently determining that the pose data is indicative of a second pose;
determining, based on the second pose, a second target portion of a second predefined image from among the one or more predefined images;
causing the first projector to project at least the second target portion onto the projection surface; and
causing the second projector to project onto the projection surface a second remaining portion of the second predefined image, wherein (i) the second remaining portion is a portion that is at least partially different from the second target portion, (ii) the projections of the second target portion and the second remaining portion collectively provide on the projection surface a complete projection of the second predefined image, and (iii) a projection-surface resolution of the second target portion is higher than a projection-surface resolution of the second remaining portion.

22. The non-transitory computer readable medium of claim 21, wherein causing the first projector to project at least the first target portion onto the projection surface comprises positioning the projection of the first target portion to compensate for the keystone effect.

* * * * *